(12) United States Patent
Panje

(10) Patent No.: US 10,433,134 B2
(45) Date of Patent: Oct. 1, 2019

(54) VIDEO GATEWAY AS AN INTERNET OF THINGS MESH ENHANCER APPARATUS AND METHOD

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/413,494

(22) Filed: Jan. 24, 2017

(65) Prior Publication Data

US 2018/0213349 A1   Jul. 26, 2018

(51) Int. Cl.
| | |
|---|---|
| *H04W 4/80* | (2018.01) |
| *H04L 29/08* | (2006.01) |
| *H04L 29/06* | (2006.01) |
| *H04L 12/28* | (2006.01) |
| *H04W 84/12* | (2009.01) |

(Continued)

(52) U.S. Cl.
CPC .............. *H04W 4/80* (2018.02); *H04L 12/281* (2013.01); *H04L 12/283* (2013.01); *H04L 65/1023* (2013.01); *H04L 67/12* (2013.01); *H04L 67/36* (2013.01); *H04L 67/42* (2013.01); *H04L 69/08* (2013.01); *H04W 8/005* (2013.01);

(Continued)

(58) Field of Classification Search
CPC .................... H04N 21/64707; H04W 88/16
See application file for complete search history.

(56) References Cited

U.S. PATENT DOCUMENTS 6,546,419 B1 *  4/2003  Humpleman ....... H04L 12/2803
                                                                  348/E7.05
6,963,925 B1 * 11/2005  Ishikawa ............. H04L 12/2805
                                                                  709/227

(Continued)

FOREIGN PATENT DOCUMENTS

WO      2013/034361 A1     3/2013

OTHER PUBLICATIONS

PCT International Search Report & Written Opinion, Re: Application No. PCT/US2018/013267, dated Apr. 26, 2018.

*Primary Examiner* — Cindy Trandai
(74) *Attorney, Agent, or Firm* — Stewart M. Wiener

(57) ABSTRACT

The disclosed system, method and computer-readable medium provide for a first wireless network, a second wireless network, a premises device and a mobile device. The first and second wireless networks are configured to operate according to respective first and second wireless networking standards, where the first and second wireless networking standards are incompatible. The mobile device is configured to communicate according to the first wireless network standard. The premises gateway device includes a transmitter for the second wireless networking standard. The premises gateway is configured to communicate according to the second wireless network standard; receive commands from the portable device, the commands formatted according to the first wireless networking standard; and output corresponding commands according to the second wireless networking standard device in a format compatible with the second wireless networking standard to allow the portable device to control an Internet of Things (IoT) device operating on the second wireless network standard.

22 Claims, 6 Drawing Sheets

(51) Int. Cl.
*H04W 8/00* (2009.01)
*H04W 88/10* (2009.01)
*H04W 92/02* (2009.01)

(52) U.S. Cl.
CPC ............ *H04W 84/12* (2013.01); *H04W 88/10* (2013.01); *H04W 92/02* (2013.01)

(56) References Cited

U.S. PATENT DOCUMENTS

| | | | | |
|---|---|---|---|---|
| 7,664,081 B2* | 2/2010 | Luoma | | H04W 88/16 |
| | | | | 370/338 |
| 7,873,059 B2* | 1/2011 | Morita | | H04N 5/775 |
| | | | | 370/401 |
| 8,165,102 B1* | 4/2012 | Vleugels | | H04W 88/08 |
| | | | | 370/338 |
| 8,271,908 B2* | 9/2012 | Li | | G06F 3/0482 |
| | | | | 345/173 |
| 8,346,954 B2* | 1/2013 | Roe | | H04L 12/282 |
| | | | | 370/230 |
| 8,407,803 B2* | 3/2013 | Alve | | G06F 21/10 |
| | | | | 726/26 |
| 8,508,762 B2* | 8/2013 | Kashioka | | G06F 3/1222 |
| | | | | 358/1.1 |
| 8,856,258 B2* | 10/2014 | Choi | | H04L 12/282 |
| | | | | 709/203 |
| 8,897,737 B2* | 11/2014 | Hahn | | G06Q 10/101 |
| | | | | 455/403 |
| 9,124,825 B2* | 9/2015 | Levine | | G06Q 10/02 |
| 9,142,242 B1* | 9/2015 | Peters | | G11B 7/00 |
| 9,408,223 B2* | 8/2016 | Naim | | H04W 72/085 |
| 9,438,571 B2* | 9/2016 | White | | H04L 63/0428 |
| 9,497,137 B2* | 11/2016 | Sukoff | | H04L 47/70 |
| 9,729,515 B1* | 8/2017 | Anantharaju | | H04L 63/04 |
| 2007/0150616 A1* | 6/2007 | Baek | | H04L 12/2803 |
| | | | | 709/246 |
| 2007/0264991 A1 | 11/2007 | Jones et al. | | |
| 2008/0034077 A1* | 2/2008 | Takashige | | G06Q 10/06 |
| | | | | 709/223 |
| 2008/0316048 A1* | 12/2008 | Abdallah | | G01V 11/002 |
| | | | | 340/854.6 |
| 2009/0232048 A1* | 9/2009 | Lynch, Jr. | | H04W 84/22 |
| | | | | 370/328 |
| 2010/0095332 A1* | 4/2010 | Gran | | G06F 17/30038 |
| | | | | 725/93 |
| 2011/0047471 A1* | 2/2011 | Lord | | G06Q 10/10 |
| | | | | 715/739 |
| 2011/0167154 A1* | 7/2011 | Bush | | H04L 12/2807 |
| | | | | 709/224 |
| 2012/0163344 A1* | 6/2012 | Bakthavathsalu | | H04W 36/30 |
| | | | | 370/332 |
| 2012/0188052 A1* | 7/2012 | Rosenblatt | | G08C 17/02 |
| | | | | 340/4.3 |
| 2013/0024288 A1* | 1/2013 | Espelien | | H04L 45/00 |
| | | | | 705/14.64 |
| 2013/0204969 A1* | 8/2013 | Nobuoka | | H04N 21/231 |
| | | | | 709/217 |
| 2013/0325952 A1* | 12/2013 | Draznin | | H04N 21/4126 |
| | | | | 709/204 |
| 2014/0022954 A1* | 1/2014 | Akers | | H04W 4/24 |
| | | | | 370/259 |
| 2014/0244768 A1* | 8/2014 | Shuman | | H04L 51/32 |
| | | | | 709/206 |
| 2014/0258444 A1* | 9/2014 | Joe | | H04L 67/2814 |
| | | | | 709/217 |
| 2014/0304356 A1* | 10/2014 | Allen, Sr. | | H04W 8/24 |
| | | | | 709/213 |
| 2014/0310604 A1* | 10/2014 | Kahkoska | | H04L 43/50 |
| | | | | 715/736 |
| 2015/0002047 A1 | 1/2015 | Sun et al. | | |
| 2015/0026302 A1* | 1/2015 | Yamada | | H04L 12/2812 |
| | | | | 709/218 |
| 2015/0142968 A1 | 5/2015 | Bhagwat et al. | | |
| 2015/0245182 A1* | 8/2015 | Scagnol | | H04L 43/065 |
| | | | | 370/312 |
| 2016/0100023 A1* | 4/2016 | Kim | | H04L 67/28 |
| | | | | 709/227 |
| 2016/0165170 A1* | 6/2016 | McRae | | H04N 5/4403 |
| | | | | 348/734 |
| 2016/0227351 A1* | 8/2016 | Gu | | H04L 61/6022 |
| 2016/0241445 A1* | 8/2016 | Kim | | H04L 67/10 |
| 2016/0353560 A1* | 12/2016 | Bortolotti | | H04W 4/70 |
| 2017/0097621 A1* | 4/2017 | Ackmann | | G05B 19/042 |
| 2017/0195866 A1* | 7/2017 | Kim | | H04W 8/005 |

\* cited by examiner

290

```
┌─────────────────────────────────────────────────────────┐
│ RECEIVING BY THE PREMISES GATEWAY VIA A WIRELESS CONNECTION │
│ WITH A MOBILE DEVICE A COMMAND INTENDED                  │
│ FOR DELIVERY TO AT LEAST ONE MESH NETWORKING PROTOCOL-   │── 291
│ COMPATIBLE DEVICE PRESENTED IN THE LIST OF DEVICES, WHEREIN │
│ THE COMMAND IS FORMATTED ACCORDING                       │
│ TO A COMMUNICATION PROTOCOL OF A WIRELESS NETWORK        │
│ STANDARD DIFFERENT FROM THE MESH NETWORKING PROTOCOL     │
└─────────────────────────────────────────────────────────┘
                            ↓
┌─────────────────────────────────────────────────────────┐
│ TRANSLATING THE RECEIVED COMMAND TO A COMMAND            │── 292
│ FORMATTED ACCORDING TO THE MESH NETWORKING PROTOCOL      │
└─────────────────────────────────────────────────────────┘
                            ↓
┌─────────────────────────────────────────────────────────┐
│ OUTPUTTING BY THE PREMISES GATEWAY THE CORRESPONDING     │
│ MESH NETWORKING PROTOCOL COMMAND TO THE AT LEAST ONE     │── 293
│ MESH NETWORKING PROTOCOL-COMPATIBLE DEVICE               │
└─────────────────────────────────────────────────────────┘
```

*FIG. 2B*

VIDEO GATEWAY AS AN INTERNET OF THINGS MESH ENHANCER APPARATUS AND METHOD

TECHNICAL FIELD

The present subject matter relates to techniques and equipment to provide a mechanism to facilitate control of Internet of Things (IoT) devices that communicate using different communication protocols or standards.

BACKGROUND

There are many different home automation communication protocols, wireless, wired, or combinations of wired and wireless in use today. Examples of home automation communication protocols include Bluetooth® including Bluetooth low energy (BLE), X10, xPL, ZigBee®, Z-wave, C-Bus, EnOcean, KNX, Thread, Universal Powerline bus or the like. Many of these protocols do not allow communication between devices that operate according to the different protocols.

For example, BLE devices cannot communicate with ZigBee devices directly and vice versa. When BLE and ZigBee devices are both located in a premises, this inability to communicate with one another in effect creates an island of BLE devices and another island of ZigBee devices. Moreover, mobile devices which include a Bluetooth transceiver but lack a ZigBee transmitter, are only able to communicate directly with BLE devices.

Since the ZigBee and BLE protocols are used to control a number of complimenting devices, it would be advantageous to exploit the home Internet of Things (IoT) ecosystem as a whole rather than limiting it based on protocol and dealing with BLE and ZigBee islands independently. However, currently available IoT web applications and/or native applications can only list IoT devices according to the hardware capability of a mobile device. Hence, computer applications presently available for mobile devices only display BLE devices since mobile devices lack ZigBee transceivers.

Presently ZigBee device gateway applications only provide access to ZigBee devices discovered by the application. In some cases, the limiting factor is that the hardware executing the application does not have access to a compatible transmitter, receiver, transceiver or the like. In addition, there is presently no way to easily connect a BLE device with a ZigBee device on a mobile device. Even if it is connected, the mobile device or the application on the mobile device has to be ZigBee aware to know the actions possible on ZigBee devices.

Hence, there is a need in not only home automation, but premises automation (e.g., home, residence, office environment, industrial environments, and the like) to provide a capability for mobile devices to be given access to devices controllable via different protocols, so that a user can seamlessly associate actions to one type of device based on events received by another type of device.

SUMMARY

The concepts disclosed herein provide an example of a premises system. The premises system includes a first wireless network, a second wireless network, a premises device and a mobile device. The first wireless network is configured to operate according to a first wireless networking standard. The second wireless network is configured to operate according to a second wireless networking standard which is incompatible with the first wireless networking standard. The mobile device is configured to communicate according to the first wireless network standard, and to present, on a user interface of the mobile device, devices adhering to the second networking standard and devices adhering to first networking standard in a common manner. The premises gateway device includes a second wireless networking standard transmitter. The premises gateway is configured to communicate according to the second wireless network standard; receive commands (formatted according to the first wireless networking standard) from the portable device; and to output commands to the second wireless networking standard device in a format compatible with the second wireless networking standard.

A method example is also provided in which the method includes launching an application by a processor of a mobile device. The launched application is presented on a touchscreen display device of the mobile device. The premises gateway receives via a wireless connection a list of mesh networking protocol controllable devices operating according to a mesh networking protocol that are hosted by the premises gateway device. The list of mesh networking protocol controllable devices including controllable devices that operate according to a wireless connectivity standard is presented on the touchscreen display. In response to an input to the touchscreen display, a wireless connectivity standard-compatible command is generated to control at least one of the mesh networking protocol devices in the presented list of mesh networking protocol controllable devices and wireless connectivity standard devices. The mobile device outputs the generated wireless connectivity standard-compatible command via a WiFi wireless connection with the premises gateway to cause the premises gateway device to control the at least one mesh networking protocol device.

Another example provides a non-transitory machine-readable medium and a process that includes providing by a premises gateway a list of devices operating according to a mesh networking protocol. The premises gateway receives via a WiFi wireless connection with a mobile device a command intended for delivery to at least one mesh networking protocol-compatible device presented in the list of devices. The command is formatted according to a communication protocol of a wireless network standard different from the mesh networking protocol. A processor of the premises gateway accesses mesh networking protocol commands stored in a memory. The received command is translated to a command formatted according to the mesh networking protocol based on a correspondence between the received command and a mesh networking protocol command stored in a memory. For example, a mesh networking protocol command that corresponds to the received wireless connectivity standard-compatible command is identified in the accessed memory. The premises gateway outputs the corresponding mesh networking protocol command to the at least one mesh networking protocol-compatible device.

Also, provided is an example of a non-transitory machine-readable medium containing machine-readable programming instructions, the instructions causing a processor to launch an application by a processor of a mobile device. The launched application is presented on a touchscreen display device of the mobile device. The premises gateway receives via a wireless connection a list of mesh networking protocol controllable devices operating according to a mesh networking protocol that are hosted by the premises gateway device. The list of mesh networking protocol controllable devices that operate according to a wireless connectivity standard is presented on the touchscreen display. In response to an input to the touchscreen display, a wireless connectivity standard-compatible command is generated to control at least one of the mesh networking protocol devices in the presented list of wireless connectivity standard devices. The mobile device outputs the generated wireless connectivity standard-compatible command via a WiFi wireless connection with the premises gateway to cause the premises gateway device to control the at least one mesh networking protocol device.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2B is a flow chart of an example process performed by a premises gateway for communication within a customer premises network system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

BLE and ZigBee are the predominant standards used in the home automation IoT environment. Mobile devices, however, do not typically include a transceiver compatible with the ZigBee communication frequencies. To allow the ZigBee IoT devices to be controlled by mobile devices, it is desirable to provide the mobile devices access to ZigBee devices in a premises networking environment, such as the home automation IoT network. It would be beneficial for the ZigBee devices to be monitored and controlled by the mobile device in a manner similar to a Bluetooth-compatible device, even if only limited monitoring and control of the ZigBee device were possible. It would also be beneficial if a user could associate Bluetooth actions with ZigBee devices based on events received by Bluetooth devices in a premises networking environment.

Typically a ZigBee device is configured to communicate with a dedicated ZigBee device gateway to facilitate control and monitoring of the ZigBee device through communication uses a WiFi compatible application executing on a mobile device or computer terminal, or via a web application executing through a website.

In some instances, the dedicated ZigBee device gateway may provide an application that only presents ZigBee devices discovered by the dedicated ZigBee device gateway on the mobile device display. Prior to the disclosed examples, there was no way to easily combine control of a BLE device and a ZigBee device on a mobile device or a gateway. While BLE and ZigBee are primarily discussed, the following examples provide systems, devices and methods that address the foregoing problems and provide the advantage of enabling one device to control and monitor premises automation devices which communicate using disparate networking protocols.

Reference now is made in detail to the examples illustrated in the accompanying drawings and discussed below.

Figure 1:
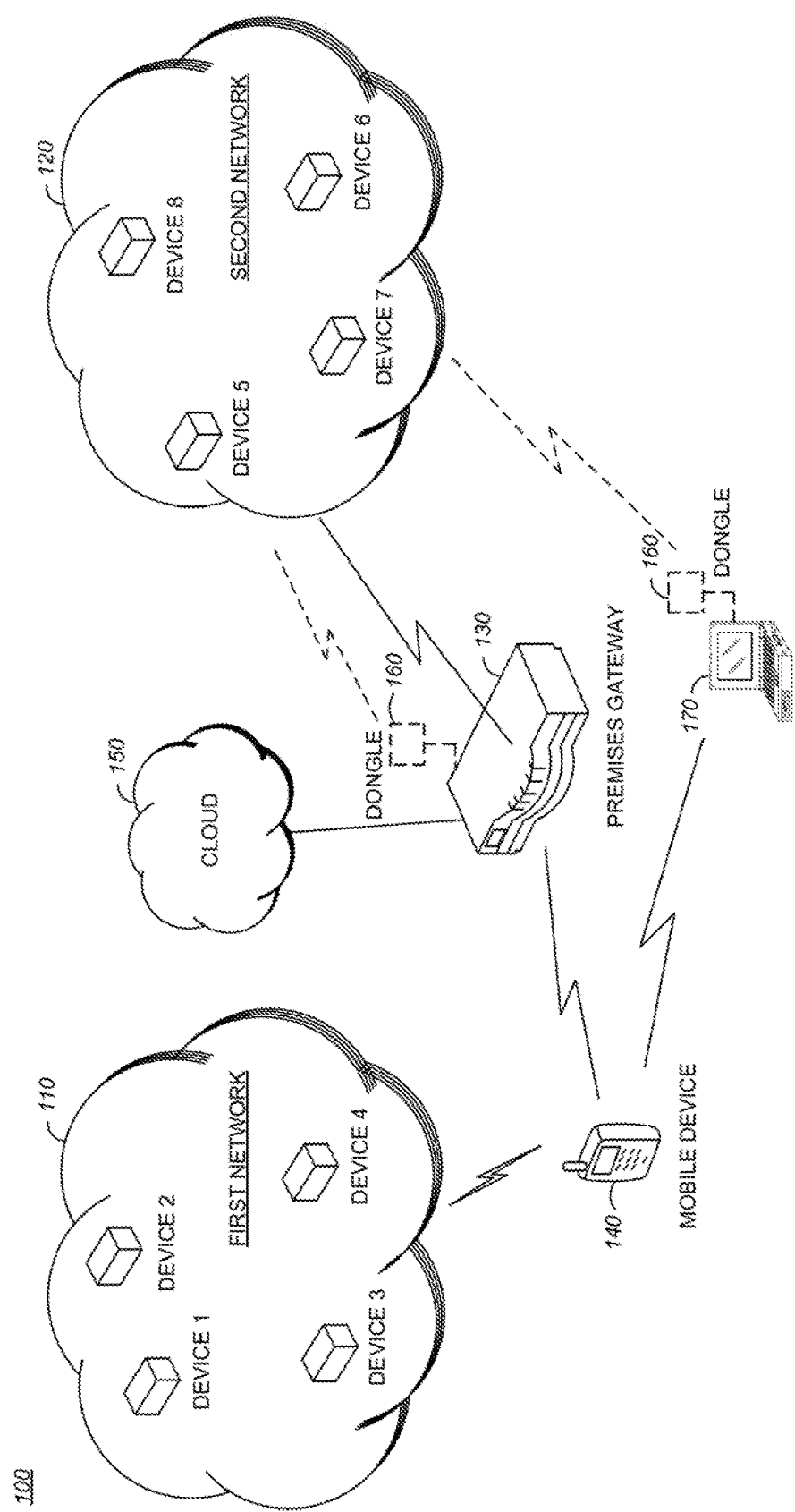
FIG. 1 is a high level diagram of an example of customer premises network system.

FIG. 1 is a high level diagram of an example of customer premises networked system. In the examples of FIG. 1, the customer premises networked system 100 includes a first network 110, a second network 120, a premises gateway 130, a mobile device 140 and cloud server 150.

The cloud server 150 may be provided by a multi-system operator, such as Comcast™, Verizon™, Time Warner™ or the like. In addition, the cloud server may include third-party applications (executing on Android™ or IOS™ operating systems) that facilitate the provision of different services by the devices within the first network 110 and the second network 120, respectively. The first and second wireless networks 110, 120 may provide communication and data exchange capabilities amongst devices within a premises system 100. A premises may be a home, a business office area, a business, such as a retail establishment or industrial setting, a school or the like.

It is envisioned that the one or more networks 110, 120 include devices dedicated to a particular networking protocol, and that the devices within the particular networks communicate according to the networking protocol of the particular network. The network protocol or wireless connectivity protocol may be a mesh network protocol that enables the devices with the particular network 110 or 120 to communicate amongst one another within their respective networks. Currently major low power IoT standards such as ZigBee and BLE (BT Smart) offer mesh networking. ZigBee and BLE can thus support several devices by forming a mesh network (self organizing and healing) of like devices. BLE devices, however, communicate only with BLE devices and ZigBee devices communicate only with ZigBee devices. BLE may be referred to as a wireless connectivity protocol or standard and ZigBee may referred to as a mesh networking protocol or standard. Further, applications are available on the cloud server 150 to connect devices together, thus offering meshing capability across devices of the same networking protocol. Unlike prior systems, the present examples provide the Devices 1-4 and Devices 5-8 in two disparate networks 110 and 120 that are controllable by a single device, such as mobile device 140, configured to control devices of different types of mesh networking and/or wireless connectivity protocols, such as BLE and ZigBee, by execution of an application by the device processor.

To overcome this deficiency of prior systems, the premises gateway 130 of FIG. 1 may be configured to communicate using a number of different communication and/or network protocols. The premises gateway 130 may be configured to translate communications (as described below) between multiple different protocols, such as the first networking protocol, the second networking protocol and a third protocol. For example, the premises gateway 130 may be configured to communicate with devices 5 to 8 within the second network 110 according to the second networking protocol, which in this example is the ZigBee protocol.

In the example of FIG. 1, the first network 110 may be configured to enable communications according to a first wireless networking protocol, such as a Bluetooth standard communication protocol. Devices 1 to 4 in the first network 110, for example, may be configured to communicate according to the Bluetooth standard. As such, the first network 110 including mobile device 140 may be a mesh network that communicates according to the Bluetooth standard. The second network 120 may be configured to enable communications according to a second wireless networking protocol, such as the ZigBee mesh networking standard. For example, Devices 5 to 8 in the second network 120 may be configured to communicate according to the ZigBee standard. In this example, the second wireless networking protocol is incompatible with the first networking protocol.

In addition, the premises gateway 130 may communicate with the mobile device 140 via the first networking standard as well as via Bluetooth. In addition, the premises gateway 130 may be configured to communicate via a third wireless networking protocol, such as WiFi provided according to one or more of the 802.11 communication specifications. The third wireless networking protocol is not compatible with the first and second protocols Within the home network system 100, the mesh network 110 may be a Bluetooth mesh that controls devices 1 to 4 that are within communication range of a primary device, such as mobile device 140. The devices 1 to 4 send communications to and/or receive communications from the mobile device 140. As the mobile device 140 moves about a premises, different controllable devices may drop in or out of the mesh network 110 as the mobile device 140 moves in or out of wireless communication range with the respective controllable devices in the mesh network 110.

In the example, controllable Devices 1 to 4 of the first mesh network 110 may be BLE controllable personal and health devices, such as audio/visual entertainment systems, such as speakers or audio routing systems, wearable devices, such as health monitoring bands that may include one or more of a thermometer, a blood pressure monitor, a heart rate monitor, a pedometer, a wristwatch, small appliances, or the like. Alternatively or in addition, the BLE controllable device may be a printer or other computer peripheral device. For some BLE controllable devices, there are one or more Bluetooth standard Generic Attribute profiles (GATT) that facilitate different services to be provided by some of the BLE controllable devices.

Meanwhile, the controllable Devices 5 to 8 operating according to the ZigBee protocol in the second network 120 may be devices that are used for metering, monitoring and controlling large and/or small appliance-type devices within the home or premises environment. For example, a controllable, ZigBee device, such as Devices 5 to 8, may be a smart energy meter, an electricity usage monitoring device, a water usage monitoring device, a home flooding detection device, a heating/ventilation system, an air conditioning system, a security system, a refrigerator and other appliances, a printer, a power outlet, a light, a door/window actuator, or the like.

A user of the controllable BLE devices 1 to 4 may use the mobile device 140 or the premises gateway (GW) 130 as an aggregator of BLE devices and use applications stored in either the premises GW 130 or a cloud server 150 to monitor and control the respective controllable BLE devices 1 to 4. Similarly, ZigBee devices at home can use premises GW 130 as the aggregator (since mobile devices lack a ZigBee transceiver) and can use applications stored in the premises GW or a cloud server to monitor or control and monitor the ZigBee devices.

A benefit of using Bluetooth standards, in particular, the Bluetooth low energy (BLE) instead of WiFi is that BLE reduces the battery consumption of mobile device 140 or devices 1 to 4 in first network 110, and operates on a frequency that is more robust than WiFi. In contrast, WiFi consumes more battery resources of a device, such a mobile device 140, due to frequent status checking with connected devices.

The premises GW 130 is configured to execute customer premises equipment (CPE) software that is compatible with the ZigBee protocol. The premises GW 130 is configured to offer and list the controllable ZigBee Devices 5 to 8 as native BLE devices, such as controllable Devices 1 to 4 on the mobile device 140. As an alternative to the mobile device 130, the GW 140 may have a web application that causes a display of the premises GW 140 to present the list of controllable ZigBee Devices 5 to 8.

The mobile device 140 also need not be configured to communicate via the ZigBee protocol since the GW 130 can translate BLE events/actions to appropriate ZigBee actions. Thus, the GW 130 offers ZigBee Devices 5 to 8 to the mobile device 140, such that each of the ZigBee Devices 5 to 9 may be viewed as another BLE device. The mobile device 140 may present a limited menu of available ZigBee actions as compared to accessing the ZigBee device through a dedicated ZigBee control hub. However, the mobile device 140 application enables a user to associate actions with ZigBee devices based on events detected by BLE devices.

In the presented example, the GW 130 offers and lists the ZigBee devices in the same manner as native BLE devices on the display of the mobile device or on the display of the GW as web application, the user can control BLE devices and ZigBee devices without switching between communication/network protocol specific applications. Hence, existing web applications and/or applications native to the mobile device 140 for controlling BLE devices 1 to 4 available for the mobile device 140 may now be used to control the controllable ZigBee devices 5 to 8.

While the ZigBee functionality was described as being configured within the premises gateway 130, the ZigBee transmitter and/or the application functionality may be configured in a dongle, such as dongle 160 that is connected to a port, such as a universal serial bus (USB) port, of the premises gateway 130. Alternatively, the dongle 160 may be coupled to a mobile device 140 or the like and may aggregate the presence of ZigBee devices that are published to the mobile device using an application as described in the following examples.

It may be beneficial to describe the above mentioned general system capabilities in more detail with reference to several examples. As will be described with reference to FIGS. 2-4, the application user, via a mobile device 140 and/or the premises GW 130, may communicate between the different networks without switching between communication/network protocol specific applications. The premises GW 130 may execute software also translates commands requesting BLE specific actions to appropriate ZigBee specific actions that are then delivered to and executed by the ZigBee device.

Figure 2A:
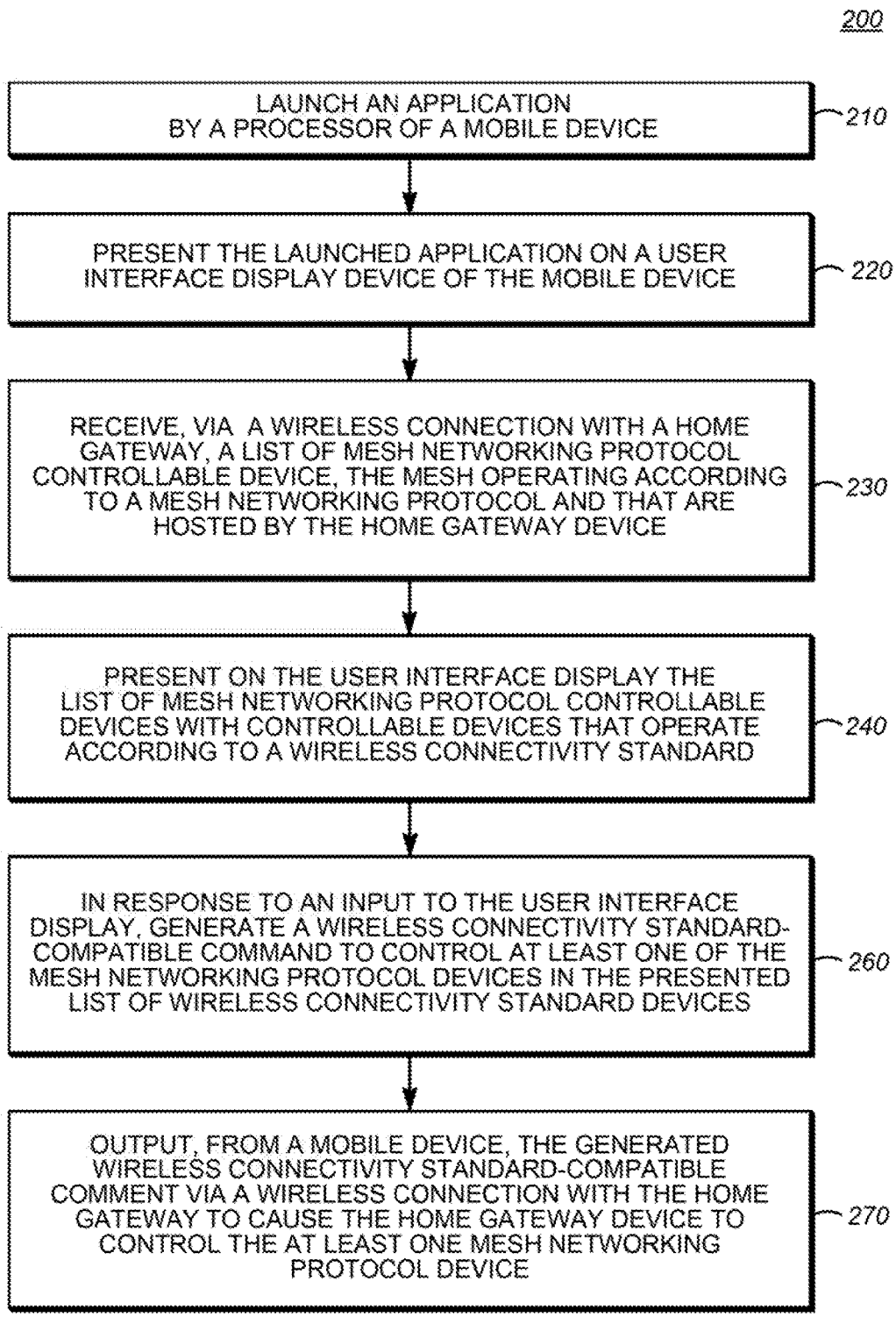
FIG. 2A is a flowchart of an example process for communicating within a customer premises network system, such as that shown in FIG. 1.

An example of the operation and functions of the system example of FIG. 1 may be described with reference to FIG. 2. FIG. 2 is a flowchart of an example process for communicating within a customer premises network environment, such as that shown in FIG. 1.

The process 200 includes launching (at 210) a mesh networking protocol conversion application by a mobile device processor. The mesh networking protocol conversion application may be a web-based application or a native application executed by the mobile device processor. For example, in response to user selection of the application in a menu of applications, the mobile device processor may cause the selected application to begin execution on the mobile device. Alternatively, the mobile device as will be explained in more detail with reference to a later example may detect the occurrence of an event, such as a determination by a global positioning system (GPS) that the mobile device 140 is located at a premises, or that a signal was received from another device or system, such as a premises security system. Detection of these events causes the mobile device 140 processor (not shown in this example) to launch the application.

In addition or alternatively, when executing the application, the mobile device 140 may be configured to obtain access to records stored at a premises gateway, such as gateway 130. The records, such as device identifiers, device profiles, device capabilities, device user preferences or the like, may relate to one or more controllable devices, such as Devices 5-8, that communicate with the premises gateway 130 according to a mesh networking protocol. In some examples, the devices that communicate with the premises gateway are proximate to the gateway. For example, the device may be within the same room, same cabinet, same piece of furniture (e.g., an entertainment center or bookshelf) or the like. In other examples, the devices that communicate with the premises 130 may be located in different rooms and/or different floors of a premises some distance away from the gateway 130. In addition, the controlled devices may be on the exterior of the premises.

The launched mesh networking protocol conversion application may include a user interface presented on a touchscreen display device of the mobile device (220). In a specific example with reference to FIG. 1, Device 5 in the second network 120 may be a ZigBee-based power outlet that supplies electrical power to a device such as an air conditioning unit or a lighting device. The application, upon being provided with a list of devices in the second network, such as network 120, may cause the display of Device 5 to appear as an BLE-compatible device instead of ZigBee-compatible device. In addition, the display of Device 5 may be enabled with a Bluetooth low energy (BLE) Generic Attribute Profile (GATT) service to thereby enable Device 5 to present profile information related to Device 5 on the mobile device display.

A list of devices, such as Devices 5-8, in the second network is received by the mobile device via a wireless connection with a premises gateway, such as gateway 130. The wireless connection may be a connection that is formed using infrared light, near field communication (NFC), ultrasound, WiFi, Bluetooth including BLE, or the like. The mesh network devices operate according to a mesh networking protocol and are hosted by the premises gateway device (230).

The list of mesh networking protocol controllable devices is presented on the touchscreen display with controllable devices that operate according to a wireless connectivity standard (240). For example, the presented list includes devices from a first network, such as network 110, and devices from a second network, such as network 120. The mobile device 130 may list the Device 5 (e.g., a Power Outlet device) from FIG. 1 as a BLE GATT Automation 10 service capable device. In another example, the Device 5 may instead be listed as a BLE GATT with a vendor service. Accordingly, the mobile device may now be configured to independently list BLE devices as well as ZigBee devices and control them as supported by the application. For example, the mobile device processor considers the ZigBee device as a GATT based service device controllable via Bluetooth-compatible commands.

The mobile device processor is configured to generate commands based on user inputs. For example, in response to an input to the touchscreen display of the mobile device, the mobile device generates a wireless connectivity standard-compatible command to control at least one of the mesh networking protocol devices in the presented list of wireless connectivity standard devices (250). The mobile device outputs the command via a wireless connection with the premises gateway to cause the premises gateway device to control the at least one mesh networking protocol device (260). For example, the application user interface presented on the touchscreen display of the mobile device allows a user to input an instruction. The instruction may be in the form of an event-action structure (e.g., in response to some event, some action is performed either by the device that experienced the event or some other device assigned to respond to the event).

In response to the input to the touchscreen display the example mobile device processor assigns an event to Device 1, which may be a BLE-protocol thermometer in first network 110. The event may be, for example, when a specific temperature is reached such as 73° F., an action may be taken by a device, such as Device 5, assigned to respond to the event. In a specific example, the device assigned to take action in response to an indication of the occurrence of the event may be a ZigBee-protocol power outlet, that is connected to a thermostat or an air conditioner. In the example, the user can assign an "On" command of Device 5 (i.e., the ZigBee device) when—Device 1 (i.e., the BLE device) outputs a temperature reading, for example, of more than 73° F. (i.e., a "temperature event"). Based on these settings made via the application user interface presented on the mobile device display, the mobile device 140 issues a command, addressed to Device 5, to the premises gateway 130 in response to Device 1 reading a temperature exceeding 73° F.

After the mobile device issues the command at step 260, the premises gateway 130 may perform a process in response to the issued command. An example process performed by the premises gateway 130 is described with reference to FIG. 2B. FIG. 2B is a flow chart of an example process performed by a premises gateway. In FIG. 2B, the example process 290 may include a step (291) of receiving by the premises gateway 130 the wireless connectivity standard-compatible command. This command may be transmitted from the mobile device to the premises gateway via a wireless connection. The command may be intended for delivery to at least one of the mesh networking protocol-compatible devices presented in the list on the mobile device touchscreen.

Returning to the Device 1 and Device 5 example discussed above, the premises gateway 130 receives the wireless connectivity standard-compatible command issued in response to the temperature event detected by Device 1 from the mobile device 140. Information included with the command may, for example, include an indication of Device 5 as the addressee of the command, an indication of the temperature reading, the source of the temperature reading, a time and/or date of the temperature reading, or the like. Based on a correspondence between the received wireless connectivity standard-compatible command and a mesh networking protocol-compatible command, at 292, the example premises gateway 130 translates the command to output a mesh networking protocol-compatible command to the at least one mesh networking protocol device, in the case of the our example, Device 5.

In an example, the received command may be a wireless connectivity standard-compatible command, such as a Bluetooth command. The premises gateway processor may translate the received command by determining a correspondence between the received wireless connectivity standard-compatible command and a mesh networking protocol-compatible command. Upon determining the correspondence, the premises gateway 130 outputs (at 293) the corresponding mesh networking protocol command to the at least one mesh networking protocol-compatible device. Other examples and/or additional features are explained in more detail below.

The premises gateway 130, for example, translates the received wireless connectivity standard-compatible formatted command into a mesh networking protocol-compatible formatted command, or determines a correspondence between the received wireless connectivity standard-compatible command and a mesh networking protocol-compatible command. The correspondence may be determined in a variety of different ways. Examples of ways to make the determination include: identifying a mesh networking protocol command by accessing a memory that corresponds to the received wireless connectivity standard-compatible command, such as by using a look-up table of various wireless connectivity standard-compatible commands that are assigned to or are linked to a corresponding mesh networking protocol-compatible command; identifying a specific field(s) in the command, reading a data value in the identified field(s), and translating the value using function to produce a value that corresponds to a value assigned to a mesh networking protocol. Other processes may be used to determine the correspondence between the wireless connectivity standard-compatible commands and the corresponding mesh networking protocol-compatible command.

The translating step in process 200 may further include identifying the received command as being formatted according to an Automation IO service of the Bluetooth Low Energy protocol. The received command from the Bluetooth Low Energy protocol may be converted to a ZigBee mesh networking protocol for transmission to the one or more of the ZigBee mesh networking devices, such as Device 6.

In another example, the execution of the application by the mobile device 140 may configure the mobile device 140 to control both the wireless connectivity standard controllable devices, such as Devices 1-4 and devices 508 of FIG. 1, via the mobile device.

In another example, the premises gateway 130 may also have BLE communication capability. As a result, the premises gateway 130 may offer ZigBee device(s), such as Devices 5-8 as BLE device(s) with a generic attribute (GATT) service profile. The Bluetooth-capable mobile device 140 may detect a BLE device proximate to the mobile device, such as Devices 1-4, as well as Devices 5-8 (provided via the premises gateway 130) seamlessly since the mobile device 140 is equipped with a BLE transceiver. For example, the premises gateway 130 offers to the mobile device 140 a list of device including Devices 1-4 and Devices 5-8. Devices 5-8 may adhere to the second networking standard, such as ZigBee, and Devices 1-4 may adhere to the first networking standard, such as BLE. In this way, the Devices 5-8 may be discovered and controlled by the mobile device 140, or any other similarly configured mobile device, that adheres to, or is BLE-compatible (i.e., the first networking standard). An application executing on the mobile device 140 may enable the mobile device to control both BLE devices, such as Devices 1-4, and the ZigBee devices, such as Devices 5-8. For example and as referenced above, the BLE GATT commands (i.e., wireless connectivity standard commands) sent by the mobile device 140 are received by the premises gateway 130, and are routed by the premises gateway 130 to one or more of the ZigBee devices (e.g., Devices 5-8) to affect an action (e.g., close the blinds, turn ON/OFF a light, change a thermostat setting or the like).

In another example, the premises gateway 130 includes a Bluetooth transceiver as well as ZigBee transmitter and/or ZigBee receiver. On a BLE interface, the premises gateway 130 advertises (i.e., spoofs) a ZigBee device as a BLE device with BLE GATT service. Now, a mobile device, such as device 140, with BLE capability and/or stock firmware, may discover the ZigBee device advertised as a BLE device by the premises gateway 140 seamlessly. The mobile device 130 may generate commands to control some functions of the ZigBee device using any off the shelf or native application running on the mobile device 140.

In another example, the premises gateway 130 provides the list of devices operating according to a mesh networking protocol to the mobile device 140. The premises gateway 130 receives via a WiFi wireless (shown in another example) connection with a mobile device 140 a command intended for delivery to at least one mesh networking protocol-compatible device, such as Devices 5' and 6', presented in the list of devices. The command is formatted according to a communication protocol of a wireless network standard different from the mesh networking protocol. The received command may be translated to a command formatted according to the mesh networking protocol based on a correspondence between the received command and a mesh networking protocol command stored in a memory, such as 210, 211 or 114. The premises gateway 130 outputs the corresponding mesh networking protocol command to the at least one mesh networking protocol-compatible device, such as Devices 5' and 6'.

In some examples, the mobile device application may be agnostic to the ZigBee protocol. In addition, the premises gateway 130 may maintain in a memory settings, such as in the event example of Device 1 and Device 5 above, or user preference setting, premise-specific settings (e.g., after 7 pm or at sunrise all blinds are closed), or the like, made via the mobile device web application. The application user interface mentioned above may take various forms. It may be helpful to describe an example of a form of the application user interface with reference to the following example.

Figure 3:
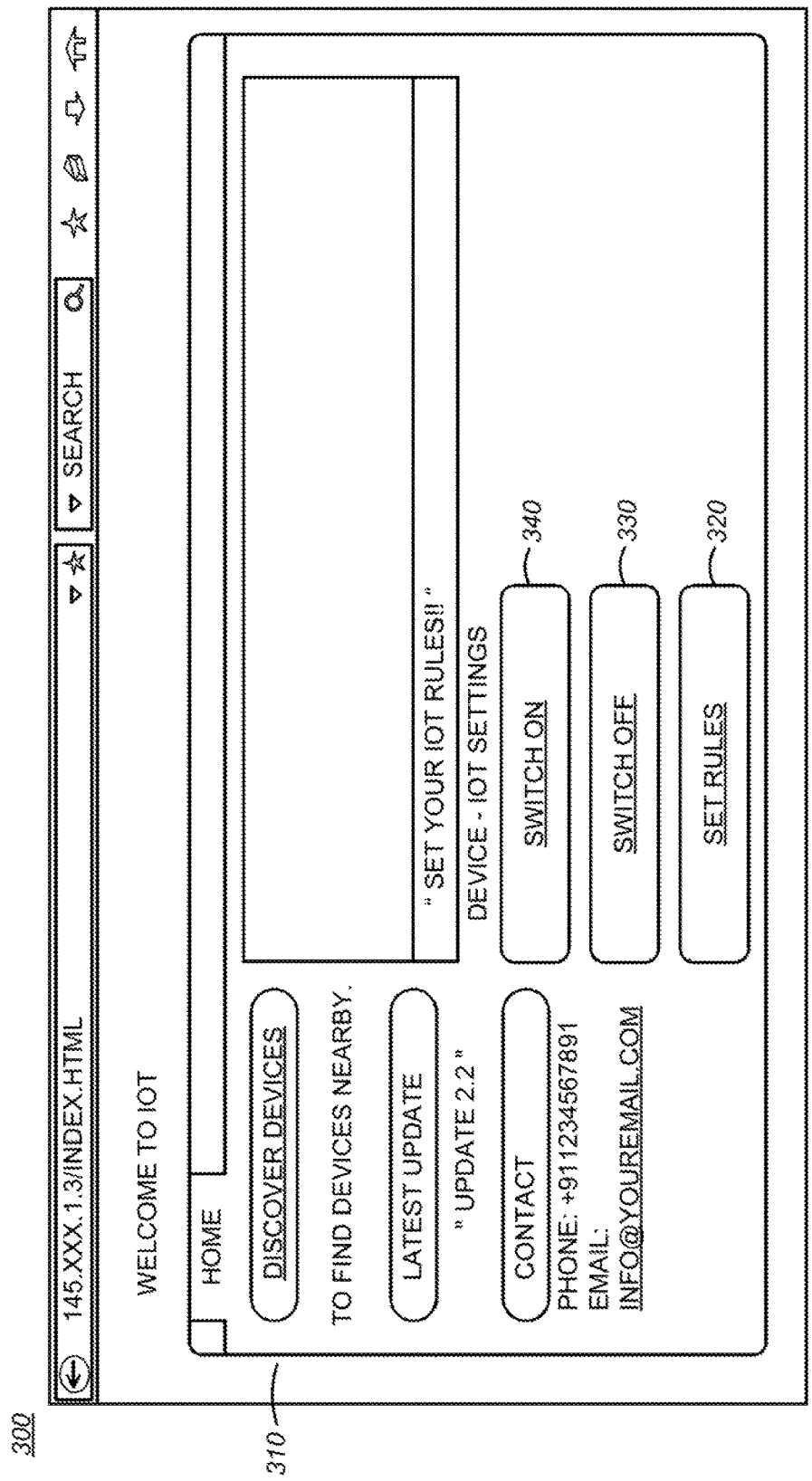
FIG. 3 is an example of a graphical user interface useful for controlling devices within a customer premises network.

FIG. 3 is an example of a graphical user interface useful for controlling devices within a customer premises network. Examples of a customer premises network include networks 110 and 120 within system 100 as described with reference to FIG. 1. The application graphical user interface (GUI) 300 may be a dedicated user interface of the application or it may be presented by a browser program executing on a device, such as a mobile phone, a tablet, a desktop computer, a laptop computer, notebook computer, a display screen on the premises gateway device, a monitor or television to which the premises gateway is coupled, or the like. The application may present, on the GUI 300, a number of different input fields and information fields. For example, a menu 305 may be provided that allows a user to select a Home screen as shown in FIG. 3, a tab to "Edit Devices", a tab to "Block" devices, and/or a tab for "Help." Each of these different tabs may provide a different function that permits a user to customize the user experience.

In the home screen shown in FIG. 3, the mobile device may receive an input selecting the control input "Discover Devices" 310 and using a premises gateway 130, such as 130, an aggregate listing of BLE and ZB devices may be provided. In the example, the application may be able to provide the aggregated list based on a Bluetooth GATT profile as discussed above. Once presented with the aggregate list the user is able to control and communicate with a number of devices that operate according to different communication protocols. As described above, the application enables a user to control both a Bluetooth-compatible device and a ZigBee compatible device The described examples enable a single device through a single application to control a number of different devices that communicate according to different and incompatible communication protocols. The application may be provided in various forms. For example, the application may be provided via the premises gateway 130 to the mobile device 140, as a plugin from the premises gateway to an application executing on or, in the case of a web application, interacting with the mobile device, or as a stand-alone application executing on the mobile device or interacting with the mobile device, if it is a web application.

For example as mentioned above, the premises gateway 130 may be equipped with both a BLE transceiver and a ZigBee transceiver. On the BLE interface, the premises gateway advertises (or spoofs) a ZigBee device as a BLE device using a BLE GATT service. Most mobile devices, such as 140, are equipped with BLE transceivers and the standard firmware, or a web application, an off-the-shelf or native application running on the mobile device, that enable discovery of BLE device advertisement. In some cases, the needed function may be provided via a software plugin that may be hosted on web application or native application. For example, the plugin may be one or more standard plugins, such as third-party plugins, that work with BLE devices. These plugins are executed by a browser application currently displaying the GUI 300 as shown in FIG. 3.

In an example of a Bluetooth-equipped premises gateway 130, the mobile device 140 detects the BLE advertisements output by the premises gateway 130 indicating the presence of a number of ZigBee devices, such as Devices 5-8, wirelessly coupled to the premises gateway 130. As a result, the mobile device 140 via the mesh networking protocol conversion application is able to interact with the ZigBee devices based on the advertisements from the premises gateway 140 by translating the BLE commands into ZigBee commands and sending them to the ZigBee devices.

The premises gateway provides a web page/application, which the user of a mobile device can access for discovering/aggregating devices that are part of a mesh network coupled to the premises gateway as well as wireless connectivity devices proximate to the mobile device within the premises. If premises gateway has a display capability, the webpage 300 may also be accessed via the premises gateway.

For example, when the application is executing and the GUI 300 is being presented, a user may select the input "Discover Devices" 310. In response to the selection of the "Discover Devices" 310, the application, or an application plugin, broadcasts a query that polls devices within the mesh network proximate to the premises gateway 130. Compatible devices within wireless range or connected via a wired connection to the premises gateway 130 respond to the query. The responses may include information identifying the type of device, a device identifier, capability of device, or other information related to the respective devices both the BLE devices proximate to the premises gateway and/or the mobile device and ZigBee devices coupled to the premises gateway. As a result, information about the responding devices may be returned to the application. Using the information returned to the application, the application may generate a list of connected BLE devices and ZigBee devices. For example, the application may return information related to the ZigBee devices, such as Devices 5-8 as well as information related to the BLE devices, such as Devices 1-4, with a BLE GATT profile.

The application GUI 300 may present command options such as "Switch ON" 340, "Switch Off" 330, or setting options such as "Set Rules" 320. Of course, other options may also be presented and any of the options, such as command or settings, may have sub-options, such as user preferences, parental controls, or the like. When the devices are shown in the list on the display device, a user may select (via a touchscreen input, keystrokes or by selection with a cursor) inputs such as "Switch ON" 340, "Switch Off" 330, or "Set Rules" 320.

In the illustrated example, only the "Switch ON" 340, "Switch Off" 330, or "Set Rules" 320 controls are shown. The following discussion describes the functions of those options in more detail. The function of the "Switch On" 340 control is to turn a selected device ON.

For example, Device 5 may be a ZigBee-compatible power outlet as mentioned in the event example above. A graphical, textual or other representation of Device 5 may be presented on the display device in a list of devices using the GUI 300. The list includes both BLE-compatible and ZigBee-compatible devices. In this example, a user may select the representation of Device 5 and select the "Switch On" 340 control. In response, the application executing on the mobile device 140 delivers a BLE-formatted command to the premises gateway 130. The premises gateway receives and parses the BLE-formatted command. Using information in the command, the premises gateway determines that the command is directed to a ZigBee device, in this case, Device 5, wirelessly coupled to the premises gateway and is not intended for another BLE device. Using information from the parsed command, the premises gateway generates a command instructing Device 5 to turn ON. The command is forwarded to Device 5 via ZigBee for execution.

Similar to the manner for turning a device ON, a user may turn a device OFF. In one example, a user may select the representation of Device 5 and select the "Switch OFF" 330 control. In response, the application executing on the mobile device delivers a BLE-formatted command to the premises gateway 130. The gateway receives and parses the BLE-formatted command. From the parsed command, the premises gateway determines that the command is directed to ZigBee Device 5, The premises gateway then generates a command instructing Device 5 to turn OFF. The command is forwarded to Device 5 for execution.

In another example, a user may set rules that dictate the operation of the device. For example, a user may wish to turn ON and OFF a lamp coupled to the Device 5 power outlet at particular times of day. For example, the light turns ON at 5 pm and turn OFF at 12 am. A user may select the representation of Device 5 and select the "Set Rule" 320 control. In response, the application executing on the mobile device may present the user with a preselected set of functions like Time ON, Time OFF, Group Devices and the like from which a user may make a selection. Returning to the example, the processor based on the selections generates a rule for turning Device 5 ON and OFF at the desired times by selecting the Time ON function input and inputting "5 pm" and selecting the Time OFF function input and inputting "12 am." The application may then present an option to confirm the generated rule.

The rule may be stored in a memory of the premises gateway 130 or in a memory of the mobile device 140. Depending upon where the rules are stored, the rules may be handled differently than the commands to perform a function. For example, if the rule is stored in a memory of the premises gateway, the command may be executed by an instance of the application executing on a premises gateway processor. For example, the application executing on the premises gateway may access the memory of the premises gateway to retrieve the stored rules. The stored rules may be formatted as BLE commands or as ZigBee commands. Based on the format of the stored rules, the application may or may not translate the stored rules. Based on the rule, the example application causes the processor to generate a command to execute the rule.

Continuing with above rule example, the application may cause the processor to generate a command instructing the Device 5 power outlet to turn ON, and to send the command to Device 5 in time for Device 5 to execute the command at 5 pm according to the rule. Using information in the rule, the premises gateway generates a command instructing Device 5 to turn OFF at 12:00 am. The command is forwarded to Device 5 for execution at the appropriate time.

In some examples, the mobile device may maintain the rules. In such an example, when executing the rule, the mobile device at a time (e.g., 4:59 pm) delivers a BLE-formatted command to the premises gateway based on the indicated time (i.e., 5:00 pm) that the device is to take some action, such as turn ON. As discussed above, the premises gateway receives the BLE-formatted command and translates it into a ZigBee-formatted command for transmission to Device 5. The ZigBee-formatted command is forwarded at the assigned time (i.e., 5 pm) to ZigBee-compatible Device 5 instructing Device 5 to Turn ON.

Similarly, when time approaches the designated turn OFF time, the mobile device 140 may command the gateway 130 to send the turn OFF ZigBee command to the device 5 at 12:00 am.

A consumer premises set top box may be viewed as an IoT premises gateway to aggregate and manage IoT use cases. Currently major low power IoT standards such as ZigBee and Bluetooth®, offer mesh networking. As mentioned above, ZigBee and Bluetooth can thus support several devices by forming a mesh network (self organizing and healing). Further, cloud applications may be used to connect devices together, thus offering meshing capability across devices. The reference to Bluetooth® includes the multiple versions under the Bluetooth standard such as Bluetooth low energy (BLE or BT Smart). While the foregoing examples primarily refer to Bluetooth and ZigBee devices, other devices that utilize different communication protocols, such as X10, KNX, and the like may also utilize the described mesh networking protocol conversion application executing on the mobile device processor, a premises gateway processor, and/or an external server (as a web application) as described above with respect to the examples of FIGS. 1-3.

Figure 4:
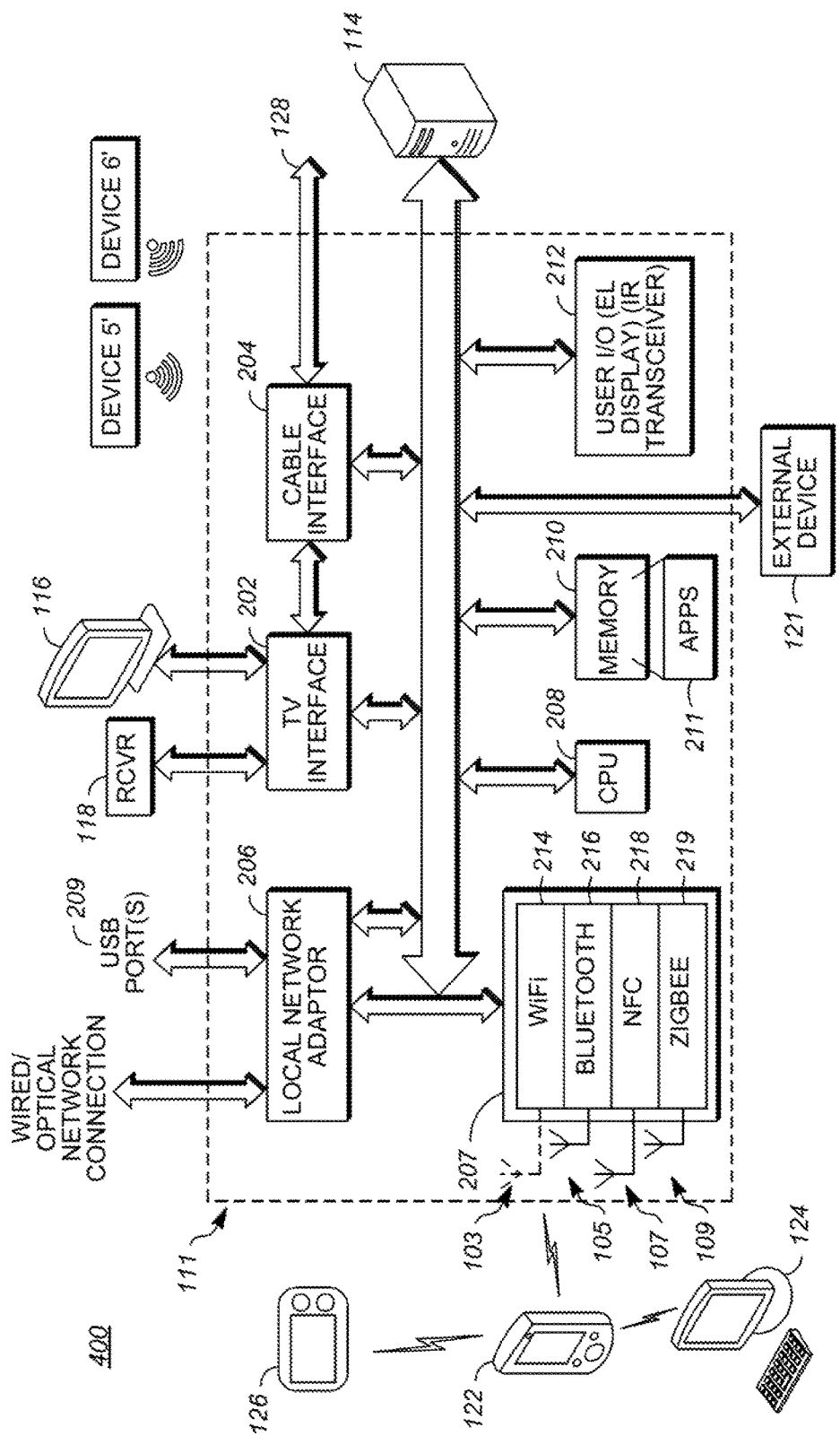
FIG. 4 is a block diagram useful for describing a premises gateway device, useful in a customer premises network system, such as that shown in FIG. 1.

It may be helpful to describe an example of a premises gateway device that is suitable for use in the above referenced examples. FIG. 4 is a block diagram useful for describing a premises gateway device that may be useable in a customer premises network environment, such as that shown in FIG. 1. There are many possible implementations of the premises gateway 140 of FIG. 1. In the example illustrated, Devices 5' and 6' may be ZigBee devices coupled in a mesh network, such as network 120 of FIG. 1. Devices 126 and 124 may, for example, communicate according to a wireless connectivity protocol, such as Bluetooth, and may be discoverable by portable devices, such as mobile device 122. According to the described examples, Devices 5' and 6' may also be discoverable by portable devices, such as mobile device 122. The devices 126 and 124 may be a wirelessly coupled thermostat, a computer terminal, an audio/video output system or the like. In an example, a network attached storage (NAS) device 114, Digital Television (DTV) receiver 116, and a radio receiver 118 may be coupled to the premises gateway 111 via physical connections. The mobile device 122 may be coupled to the gateway 111 via a short-range radio frequency (RF), magnetic or optical connection (e.g. 802.11 WiFi, Bluetooth, near field communication (NFC) or infra-red (IR)), and Digital Versatile Disc (DVD) player 120, may be coupled to the premises gateway 111 via a wired connection such as a universal serial bus (USB) cable, a FireWire cable, an Ethernet connection and/or via a short-range RF, magnetic or optical wireless connection. Each of these connections may be considered to be a separate communications channel.

The premises gateway 111 includes a central processing unit (CPU) 208, a communication interface, 207, a local network adaptor 206, a television interface, 202, a cable interface 204, a user input/output (I/O) 212, and a memory 210 for storing programming instructions including program instructions executable by the CPU 208 for converting the commands received from the portable device to the second networking standard device commands. Alternatively, the converting and other functions' program instructions may be stored as the mesh networking protocol conversion application in Apps 211.

The premises gateway 111 communication interface 207 may be an interface to one or more data communication transmitters and/or transceivers for communicating within the one or more wireless networks. For example, the interface 207 may couple to an 802.11 or WiFi transmitter and/or receiver 214, a Bluetooth transmitter and/or transceiver 216, a near field communication (NFC) transmitter and/or receiver 218, ZigBee transmitter and/or receiver 219. The premises gateway 111 may be configured to operate in a third wireless network that operates according to another wireless networking standard. For example, in addition to the first and second wireless networking standards, such as Bluetooth and ZigBee network standards, described above, the premises gateway 111 may be configured to operate according to a third wireless networking standard, such as 802.11.

The example Bluetooth transceiver 216 of the premises gateway 111 may be coupled to an antenna 105 that is configured to send and receive Bluetooth signals; the WiFi channel 214 may be coupled to an antenna 103 that is configured to send and receive WiFi signals; and the NFC transceiver 218 may be coupled to an antenna 107 that is configured to send and receive NFC signals. The premises gateway 111 also includes a local network adaptor 206 interface for local communication with consumer premises equipment (CPE) devices, such as mobile device 122 and Devices 5' and 6'. In this example, the local network adapter 206 is coupled to a wired/optical communication port as well as a USB port(s) 209 and to the WiFi channel 214, the Bluetooth transceiver 216, the NFC transceiver 218 and the ZigBee transmitter/transceiver 219. In some examples, WiFi channel 214 may be coupled to a WiFi access point (not shown).

In addition, the ZigBee transmitter/transceiver 219 may be coupled to an antenna 109 that is configured to transmit and/or receive ZigBee signals. For example, the ZigBee transmitter 219 may transmit signals to ZigBee-compatible Device 5' and Device 6' that are configured in a home automation network or the like in the premises in which the premises gateway 111 is located. Devices 5' and 6' may communicate according to a particular communication protocol or standard, such as the ZigBee communication protocol. For example, Devices 5' and 6' may be ZigBee-compatible power outlets, appliances, or the like, such as Devices 5-8 of FIG. 1. As such, the premises gateway 111 may act as a gateway for controlling communications within a mesh network configured with the ZigBee devices.

A user may wish to control one or more devices in a premises in which the user is located. In an example of the operation of the premises gateway 111, the user of mobile device 122 may select an application from a menu of applications presented on a display device of the mobile device 122. One of the applications in the menu may be useful to control devices in a wireless connectivity protocol network as well as devices in a mesh network as described above with reference to FIGS. 1-3. In response to the selection of the application, the processor of the example mobile device either accesses a memory of the mobile device or sends a request to the premises gateway 111, to obtain the selected application. For example, the application (or an application plug-in) may be stored in the memory of the mobile device 122 in which case, the mobile device processor (not shown in this example) obtains the application from memory.

Upon launching of the application, the mobile device 122 may begin a control process as described above with reference to FIGS. 2 and 3. The control process may be substantially the same as that described above with reference to FIGS. 2 and 3. Therefore, a detailed explanation of the process steps 210-270 will not be repeated.

Alternatively, in response to selection of the application or the application plug-in, the mobile device 122 may forward a request to the premises gateway 111 requesting that the application or the application plug-in be delivered to the mobile device 122. Upon receipt of the request, the premises gateway 111 may retrieve a copy or instance of the application or application plug-in from the application memory 211, and deliver the application or application plug-in to the mobile device 122. Alternatively, instead of application memory 211, the application or application plug-in may be retrieved from the NAS device 114 or from storage on the cloud server (not shown in FIG. 4).

In yet another alternative, the premises gateway 111 upon receipt of a request from the mobile device 122 may send a request to a web server or application server. The web server or application server may be configured to provide the services needed by the mobile device 122 to present a GUI, such as GUI 310 and a list of devices controllable by the mobile device.

The mobile device 122 and the premises gateway 111 may exchange communications via Bluetooth signals, WiFi signals or a combination of both. While the ZigBee functionality was described as being configured within the premises gateway 111, the ZigBee transceiver and/or the application functionality may be configured in a dongle, such as dongle 160 (shown in FIG. 1) that is connected to a port, such as a universal serial bus (USB) port, of the premises gateway 111. Alternatively, the dongle may be coupled to a user device, such as 170 of FIG. 1, or the like and may aggregate the presence of ZigBee devices that are published to the mobile device using an application as described above.

For example, the mobile device 122 may communicate directly with the dongle to request the mesh networking protocol conversion application as described with reference to FIGS. 1-3 above.

The user devices may be CPE devices such as a NAS device 114, a DTV receiver 116, a radio receiver 118, an external entertainment device 120 including a streaming video facility, a mobile device 122 or a computer 124. These CPE devices can be located at or near a user's premises. In the example system, mobile device 122 may have wireless telecommunications capability. In FIG. 4, only particular CPE devices 114, 116, 118, 121, and 122 are shown for illustrative purposes, but more or fewer can be coupled to the premises gateway 111. For example, the ZigBee devices 5' and 6' may also be considered to be CPE devices. Each of the CPE devices 114, 116, 118, 121, 122, 5' and 6' coupled to the premises gateway 110 uses a predetermined protocol. This protocol may be, for example, IEEE 802.11 WiFi, Universal Plug and Play Device Management (UPnP DM), IEEE 1394 FireWire, IEEE 802.15 (e.g. WPAN), Bluetooth, Bluetooth Low Energy (BLE), ZigBee specifications, such as ZigBee RF4CE, ZigBee home automation 1.2, and the like or other data exchange protocol. Device 126 may be a Bluetooth-compatible thermostat, and device 124 may be a Bluetooth-compatible keyboard and monitor.

The protocol may determine how information about the IoT device, such as codes indicating a particular manufacturer, model number and serial number, device capabilities (e.g., data download capabilities), device firmware versions, and/or the like may be obtained. For example, this device information may be provided 1) automatically when the device is connected, or 2) in response to a device discovery request provided by the premises gateway 111, NAS device 114 or an external server (not shown). The CPU 208 may store the device information—either locally in the memory 210, NAS device 114 or remotely—for use to provide user preferences or other control parameters with respect to rules established in the manner as explained above.

The processor 208, for example, may be configured to communicate with one or more first networking standard-enabled premises devices, such as mobile device 140 of FIG. 1, that is operating according to a first wireless networking standard, and respond to and send control signals from the mobile device, such as mobile device 140 of FIG. 1. The first wireless networking standard may be a wireless connectivity standard such as a version of Bluetooth or the like. In addition, the processor 208 is configured to communicate with one or more second networking standard-enabled premises devices, such as Devices 5' and 6' operating according to the second networking standard, such as the ZigBee mesh networking protocol. The second networking standard, such as ZigBee mesh networking protocol, is incompatible for direct communication between the one or more second networking standard-enabled premises devices (e.g., Devices 5' and 6') and the mobile device 140 since the mobile device 140 is not configured with a ZigBee compatible transmitter.

The example premises gateway 111 also includes cable interface 204 for receiving programming and Internet protocol (IP) packets from an external content providers (not shown) and the like. The IP packets may include, for example, encapsulated MPEG transport streams. The TV interface circuitry 202 may include circuitry that reconstitutes selected MPEG transport streams from the IP packets and sends the MPEG transport streams to the DTV device 116. The cable interface may also send and receive data over the network to/from a content server (not shown) to obtain the media content and possibly meta-data files or meta-data related instructions from the external content providers. The premises gateway 111 also includes circuits forming one or more processors to implement a CPU 208 and memory 210 for controlling operations of the premises gateway, including performing the processing of the IP packets, media content and mesh network/IoT commands. The memory 210 may include one or more memories and/or other program and data storage devices, for example, for storing instructions executable by the CPU 208. For example, the memory 210 may include computer applications (Apps) 211, such as a computer application that provides the mesh network protocol translation and/or conversion functions, command and control functions, and application GUI functions as described above.

The example premises gateway 111 also includes a user I/O interface 212. The user I/O interface 212 may include an electroluminescent (EL), liquid crystal device (LCD), or light emitting diode (LED) display for displaying information to the user. The user I/O interface 212 may also include an infrared (IR) transceiver for transmitting and receiving instructions to and from the user's remote control or other IR capable device. Although not shown, this IR transceiver may provide a communication channel for sending and receiving short-range optical communications between the premises gateway and one or more of the CPE or mesh network devices 114, 116, 118, 121, 122, 124, 126, 5' and 6'.

In this example, the premises gateway 110 includes the functionality of a set-top box (STB). It is contemplated, however, that the STB may be separate from the premises gateway. In this instance, the premises gateway provides the network connection and the STB provides the media functionality. When the STB is separate from the premises gateway 110, the STB may be connected to the cable line in parallel with the premises gateway or may be connected to the premises gateway 110 to receive IPTV packets from the premises gateway.

Figure 5:
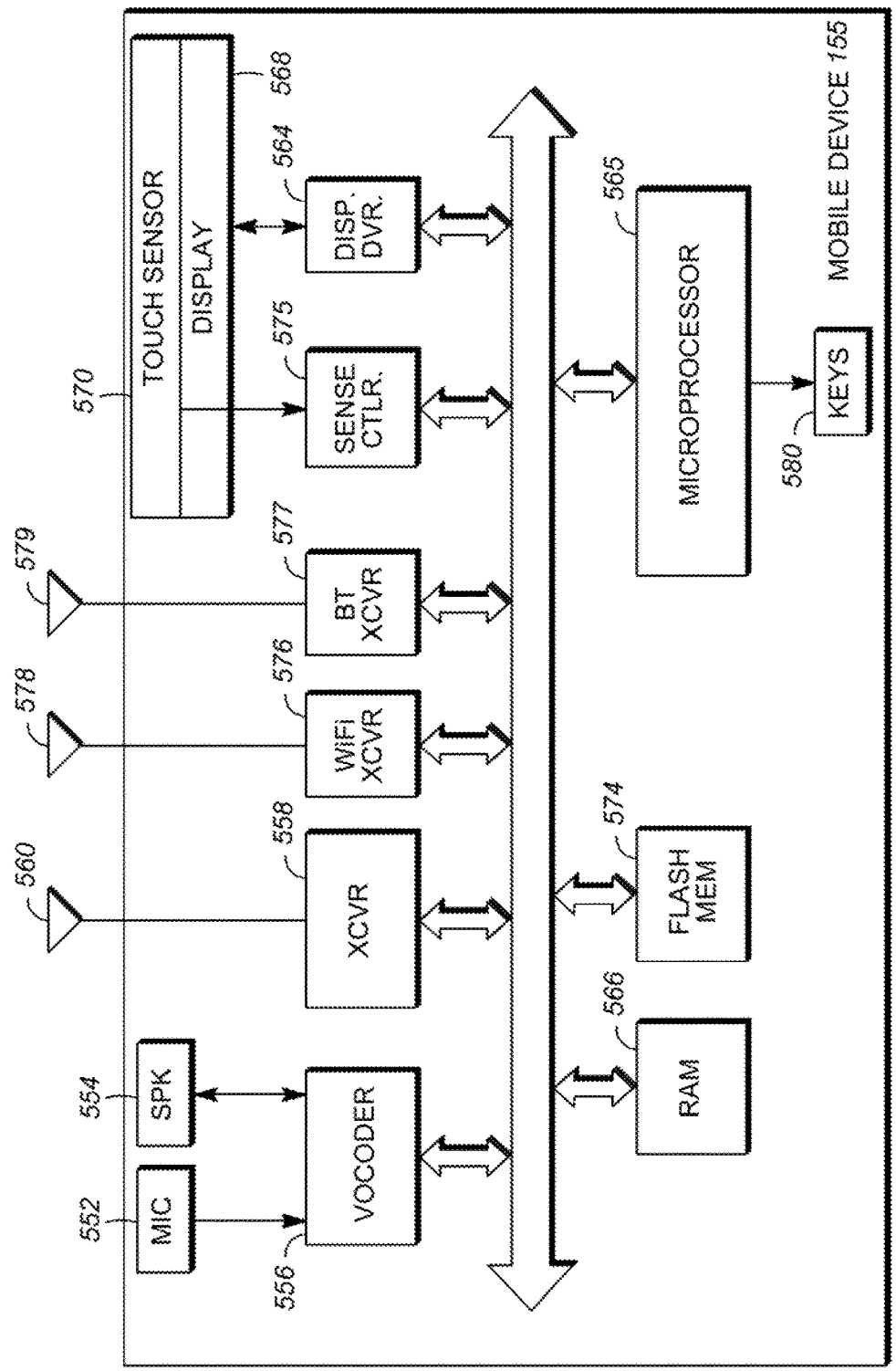
FIG. 5 is a block diagram of an example mobile device usable in the examples illustrated in FIGS. 1-4.

FIG. 5 is a block diagram of an example mobile device 122. The mobile device includes a touch-screen display 568 for displaying application screens, messages, menus or the like and for receiving input selections such as dialed numbers and web page navigation. A keypad 280 includes a limited number of keys that perform functions such as power-on/off, sound volume adjustments and other functions of the device.

A microprocessor 565 serves as a programmable controller for the mobile device 155, in that it controls all operations of the mobile device 155 in accord with programming that it executes, for all operations. In the example, the mobile device 155 includes flash type program memory 574, for storage of various "software" or "firmware" such as an operating system and application programs. In addition the memory 574 may hold mobile configuration settings, such as mobile directory number (MDN) and/or mobile identification number (MIN), etc. The mobile device 122 may also include a non-volatile random access memory (RAM) 566 for a working data processing memory.

The mobile device 155 further includes a microphone device 552, speaker 554 and vocoder 556 for audio input and output functions. The mobile station 155 also includes at least one digital transceiver (XCVR) 558, for digital wireless communications, such as cellular communications, and at least one or two short-range radio frequency transceivers 576 and 577, shown in the example as a WiFi transceiver 576 and a Bluetooth (BT) or BLE transceiver 577, respectively, to communicate with the premises gateway 111 via a WiFi channel 214 and/or Bluetooth transceiver 216. The Bluetooth transceiver may also communicate with proximate Bluetooth devices, such as devices 1-4 in FIG. 1. The transceiver 558 provides two-way wireless communication of information, such as vocoded speech samples and/or digital information, in accordance with the technology of the telecommunications network. Each example transceiver 558, 576 and 577 connects through RF send and receive amplifiers (not separately shown) to a respective antennas 560, 578 and 579. The transceiver 558 may also support various types of mobile messaging services, such as short message service (SMS), enhanced messaging service (EMS) and/or multimedia messaging service (MMS) and may include a web browser for interacting with websites either through the telecommunications transceiver 558 or the short-range transceiver 576. The BT transceiver 577 may interact with other Bluetooth-equipped devices.

The user interface of the exemplary mobile device 155 includes a display 568, which the microprocessor 562 controls via a display driver 564, to present visible outputs to the device user. The user interface also includes a touch/position sensor 570 that overlies the display 568 and is relatively transparent, so that the user may view the information presented on the display 568. A sense controller 572 senses signals from elements of the touch/position sensor 570 and detects occurrence and position of each touch of the screen formed by the display 568 and sensor 570. The sense controller 572 provides touch position information to the microprocessor 562, which can correlate that information to the information currently displayed via the display 568, to determine the nature of user input via the sensor 570.

Aspects of the methods of the exemplary apparatus and method outlined above may be embodied in programming, e.g. in the form of software, firmware, or microcode executable by a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host processor into the memory 210 of the premises gateway 111. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical or similar elements in the process, method, article, or apparatus that comprises the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A premises system, comprising:
   a first wireless network configured to operate according to a first wireless networking standard;
   a second wireless network configured to operate according to a second wireless networking standard, the second wireless networking standard incompatible with the first wireless networking standard;
   a mobile device configured to:
      communicate according to the first wireless network standard, and
      present, on a user interface of the mobile device, devices adhering to the first wireless networking standard and devices adhering to the second wireless networking standard in a common manner; and
   a premises gateway device comprising:
      a second wireless networking standard transmitter for communicating with the second wireless network; and
   the premises gateway device configured to:
      communicate according to the second wireless network standard;
      receive commands from the mobile device, the commands formatted according to the first wireless networking standard;
      advertise a device over the second wireless network as a spoofed device adhering to the first wireless networking standard; and
      based on the received commands from the first mobile device, output corresponding commands to the second wireless networking standard device, the corresponding commands in a format compatible with the second wireless networking standard, such that the corresponding commands appear to be for the spoofed device.

2. The system of claim 1, wherein the premises gateway device further comprises:
   a memory for storing programming instructions for converting the commands received from the mobile device to the second networking standard device commands; and
   a processor, coupled to the memory and the second networking transmitter, wherein the processor, upon execution of programming instructions retrieved from the memory, is configured to:
      communicate, via the second networking transmitter, with one or more second networking standard-enabled premises devices in the second wireless network;
      offer the devices adhering to the second networking standard in the manner of the devices adhering to the first networking standard for discovery by the mobile device adhering to the first networking standard;
      receive the first networking standard-formatted commands from the mobile device;
      translate the first networking standard commands to appropriate second networking standard device commands; and
      send the second networking standard device commands to the second networking transceiver for transmission to at least one of second networking standard-enabled premises devices.

3. The system of claim 2, wherein the processor is configured to:
   communicate with one or more first networking standard-enabled premises devices operating according to a first networking standard, and
   respond to control signals from the mobile device.

4. The system of claim 3, wherein the mobile device is further configured to control the first networking standard-enabled premises devices.

5. The system of claim 1, wherein:
the first wireless networking standard is a Bluetooth networking standard, and
the second wireless networking standard is a ZigBee networking standard.

6. The system of claim 5, wherein the premises gateway device includes an interface to a data communication transceiver for communicating within a third wireless network, the third wireless network configured to operate according to a third wireless networking standard that is incompatible with both the first and the second wireless networking standards.

7. A method, comprising:
launching an application by a processor of a mobile device;
presenting a user interface display of the launched application on a touchscreen display device of the mobile device;
receiving, via a wireless connection with a premises gateway, a list of mesh networking protocol controllable devices operating according to a mesh networking protocol that are hosted by the premises gateway device;
presenting on the user interface display the list of mesh networking protocol controllable devices including controllable devices that operate according to a wireless connectivity standard;
in response to an input to the touchscreen display, generating a command for controlling at least one of the mesh networking protocol controllable devices in the presented list of wireless connectivity standard devices and mesh networking protocol controllable devices; and
outputting from the mobile device the generated command via a WiFi wireless connection with the premises gateway to cause the premises gateway device to control the at least one mesh networking protocol device by advertising a device over a second wireless network as a spoofed device adhering to a first wireless networking standard associated with the at least one mesh networking protocol device, such that commands originating from the mobile device are sent to the at least one mesh networking protocol device as corresponding commands that appear to be for the spoofed device.

8. The method of claim 7 further comprising:
selecting a device from the list presented on the user interface display;
selecting a set rule control on the user interface display; and
in response to the selection of the set rule control on user interface display, presenting on the user interface display a preselected set functions for selection by a user.

9. The method of claim 8 further comprising:
in response to a selection of one or more of the preselected set functions, establishing a rule for controlling operation of the selected device.

10. The method of claim 7 further comprising:
presenting on the user interface display one or more operations that may be performed by at least one of the mesh networking protocol controllable devices presented in the list.

11. A method comprising:
providing by a premises gateway a list of devices operating according to a mesh networking protocol;
receiving by the premises gateway via a WiFi wireless connection with a mobile device a command intended for delivery to at least one mesh networking protocol-compatible device presented in the list of devices, wherein the command is formatted according to a communication protocol of a wireless network standard different from the mesh networking protocol;
advertising a device over the wireless network as a spoofed device adhering to the communication protocol of the wireless network standard different from the mesh networking protocol;
translating the received command to a corresponding command formatted according to the mesh networking protocol; and
outputting by the premises gateway the corresponding mesh networking protocol command to the at least one mesh networking protocol-compatible device, such that the corresponding command appears to be for the spoofed device.

12. The method of claim 11, further comprising:
executing an application by the mobile device that configures the mobile device to control both the wireless connectivity standard controllable devices paired with the mobile device and the mesh networking protocol-compatible devices on the presented list of mesh networking protocol devices.

13. The method of claim 11, wherein the translating comprises:
accessing mesh networking protocol commands stored in a memory; and
identifying in the accessed memory a mesh networking protocol command that corresponds to the received wireless connectivity standard-compatible command.

14. The method of claim 11, wherein:
the command is generated according to a Bluetooth Low Energy standard, and the wireless connectivity standard devices are Bluetooth low energy-compatible devices; and
the mesh networking protocol is a ZigBee mesh networking protocol, and the mesh networking protocol device is a ZigBee-compatible device.

15. The method of claim 14, wherein the translating comprises:
identifying the received command as being formatted according to an Automation IO service of the Bluetooth Low Energy protocol; and
converting the received command from the Bluetooth Low Energy protocol to a ZigBee mesh networking protocol for transmission to the one or more of the ZigBee mesh networking devices.

16. The method of claim 11, further comprising:
formatting information related to each mesh networking protocol device in the list of mesh networking protocol devices to be presented as a Bluetooth device when presented on a touchscreen display of a mobile device.

17. A non-transitory machine-readable medium containing machine-readable programming instructions, the instructions causing a processor to:
launch an application by a processor of a mobile device;
present a user interface display of the launched application on a touchscreen display device of the mobile device;
receive, via a wireless connection with a premises gateway, a list of mesh networking protocol controllable devices operating according to a mesh networking protocol that are hosted by the premises gateway device;

present on the user interface display the list of mesh networking protocol controllable devices including controllable devices that operate according to a wireless connectivity standard;

advertise a device over the wireless network as a spoofed device adhering to the communication protocol of the wireless network standard different from the mesh networking protocol;

in response to an input to the touchscreen display, generate a command for controlling at least one of the mesh networking protocol devices in the presented list of wireless connectivity standard devices; and output from the mobile device the generated command via a WiFi wireless connection with the premises gateway to cause the premises gateway device to control the at least one mesh networking protocol device.

18. A non-transitory machine-readable medium of claim 17, wherein the machine-readable programming instructions further cause the processor to:

select a device from the list presented on the user interface display;

select a set rule control on the user interface display; and in response to the selection of the set rule control on user interface display, present on the user interface display a preselected set functions for selection by a user.

19. The non-transitory machine-readable medium of claim 18, wherein the machine-readable programming instructions further cause the processor to:

in response to a selection of one or more of the preselected set functions, establish a rule for controlling operation of the selected device.

20. The non-transitory machine-readable medium of claim 17, wherein the machine-readable programming instructions further cause the processor to:

present on the user interface display one or more operations that may be performed by at least one of the mesh networking protocol controllable devices presented in the list.

21. A non-transitory machine-readable medium containing machine-readable programming instructions, the instructions causing a processor to:

provide by a premises gateway a list of devices operating according to a mesh networking protocol;

receive by the premises gateway via a WiFi wireless connection with a mobile device a command intended for delivery to at least one mesh networking protocol-compatible device presented in the list of devices, wherein the command is formatted according to a communication protocol of a wireless network standard different from the mesh networking protocol;

advertise a device over the wireless network as a spoofed device adhering to the communication protocol of the wireless network standard different from the mesh networking protocol;

translate the received command to a command formatted according to the mesh networking protocol; and output by the premises gateway the corresponding mesh networking protocol command to the at least one mesh networking protocol-compatible device.

22. The non-transitory machine-readable medium of claim 21, wherein the machine-readable programming instructions further cause the processor to:

receive by the premises gateway via the WiFi wireless connection with the mobile device the outputted command intended for delivery to at least one mesh networking protocol-compatible devices presented in the list; and based on a correspondence between the received command and a mesh networking protocol-compatible command, output the corresponding mesh networking protocol-compatible command to the at least one mesh networking protocol device.

* * * * *